United States Patent [19]

Henning et al.

[11] Patent Number: 6,099,636
[45] Date of Patent: Aug. 8, 2000

[54] N,N'-DIMETHYLPERYLENE-3,4,9,10-TETRACARBOXYLIC ACID DIIMIDE PIGMENTS SUITABLE FOR WATER-BASED PAINTS

[75] Inventors: Georg Henning; Peter Blaschka, both of Ludwigshafen; Arno Böhm, Mannheim, all of Germany

[73] Assignee: BASF Aktiengesellschaft, Ludwigshafen, Germany

[21] Appl. No.: 09/101,444

[22] PCT Filed: Jan. 9, 1997

[86] PCT No.: PCT/EP97/00064

§ 371 Date: Jul. 16, 1998

§ 102(e) Date: Jul. 16, 1998

[87] PCT Pub. No.: WO97/26301

PCT Pub. Date: Jul. 24, 1997

[30] Foreign Application Priority Data

Jan. 19, 1996 [DE] Germany ............................ 196 01 752

[51] Int. Cl.⁷ ............................ C09B 67/22; C09B 67/08; C09B 5/62; C09D 5/02
[52] U.S. Cl. .............................. 106/498; 106/493; 546/37
[58] Field of Search ..................................... 106/493, 498; 546/37

[56] References Cited

U.S. PATENT DOCUMENTS

| 3,375,123 | 3/1968 | Krocker et al. ........................ 106/419 |
| 3,615,800 | 10/1971 | Spietschka et al. .................... 106/493 |
| 3,628,976 | 12/1971 | Stocker ................................. 106/278 |
| 3,976,649 | 8/1976 | Fabian et al. ............................ 546/66 |
| 4,153,602 | 5/1979 | Schiessler et al. ....................... 546/37 |
| 4,189,582 | 2/1980 | Hoch et al. .............................. 546/37 |
| 4,301,049 | 11/1981 | Funatsu et al. ......................... 524/190 |
| 4,431,806 | 2/1984 | Spietschka et al. ...................... 546/37 |
| 4,450,273 | 5/1984 | Graser ...................................... 546/37 |
| 4,496,731 | 1/1985 | Spietschka et al. ...................... 546/37 |
| 4,797,162 | 1/1989 | Spietschka et al. .................... 106/498 |
| 5,472,494 | 12/1995 | Hetzenegger et al. ................. 106/493 |

FOREIGN PATENT DOCUMENTS

| 662 638 | 10/1965 | Belgium . |
| 679 457 | 10/1966 | Belgium . |
| 0 636 666 | 2/1995 | European Pat. Off. . |
| 1 576 477 | 8/1969 | France . |
| 2 300 115 | 9/1976 | France . |
| 30 16 717 | 11/1970 | Germany . |
| 2504481 | 8/1976 | Germany ................................ 106/493 |
| 3436206 | 4/1986 | Germany ................................ 106/498 |
| 1 313 147 | 4/1973 | United Kingdom . |
| 2029440 | 3/1980 | United Kingdom ................... 106/498 |

*Primary Examiner*—Anthony Green
*Attorney, Agent, or Firm*—Oblon, Spivak, McClelland, Maier & Neustadt, P.C.

[57] ABSTRACT

A N,N'-dimethylperylene-3,4,9,10-tetracarboxylic diimide pigment suitable for aqueous basecoats is obtainable by coating the diimide, suspended in an aqueous medium, with a carboxyl-carrying resin in the presence of 3,4-dicarboximidoperylene-9-sulfonic acid or salts thereof and with a $C_8$–$C_8$-alkyl- or-alkenylamine, isolating and drying the coated dimide and then subjecting it to dry milling.

8 Claims, No Drawings

N,N'-DIMETHYLPERYLENE-3,4,9,10-TETRACARBOXYLIC ACID DIIMIDE PIGMENTS SUITABLE FOR WATER-BASED PAINTS

The present invention relates to a novel N,N'-dimethylperylene-3,4,9,10-tetracarboxylic diimide pigment which is suitable for aqueous basecoats and which is obtainable by coating the diimide, suspended in an aqueous medium, with a carboxyl-carrying resin in the presence of 3,4-dicarboximidoperylene-9-sulfonic acid or salts thereof and with a $C_8$–$C_{18}$-alkyl- or -alkenylamine, isolating and drying the coated diimide and then subjecting it to dry milling.

The invention additionally relates to the preparation of this pigment and to its use for pigmenting aqueous basecoats, and to aqueous basecoats comprising this pigment.

It is known that N,N'-dimethylperylene-3,4,9,10-tetracarboxylic diimide (C.I. Pigment Red 179) is obtained in the synthesis in a form which when incorporated directly into coating systems or other high molecular mass organic systems leads to poor rheological properties and to unsatisfactory color properties of the pigmented systems. Additional treatment of the pigment is therefore carried out in an attempt to improve its performance properties.

For instance, DE-A-25 04 481 describes a process for preparing transparent C.I. Pigment Red 179 of good color strength where, during the synthesis if the diimide from perylene-3,4,9,10-tetracarboxylic dianhydride and aqueous methylamine, for completion of the reaction by heating a resin acid is added which is washed off again when the pigment is isolated or is precipitated as an alkaline earth metal salt onto the pigment.

DE-A-43 25 247 discloses the use of 3,4-dicarboximidoperylene-9-sulfonic or carboxylic acids and salts thereof as a pigment additive for C.I. Pigment Red 179, in which it is also possible in addition to employ polymers with polar anchor groups, such as polymers based on ethylene oxide and propylene oxide adducts with 2-(diethyl)-aminoethanol or block copolymers of polyethyleneimine and 6-caprolactone. The coating of the pigment with additive and, if desired, polymer is accomplished by stirring an aqueous suspension of the diimide, isolated in the course of synthesis as a water-moist filter cake, and of the coating agents and then carrying out heating, or by triturating or grinding the previously dried diimide with the coating agents in the presence or absence of water. C.I. Pigment Red 179 coated in this way indeed shows a marked improvement in rheology and color properties (bright, yellowish red, transparent colorations) when compared with the uncoated pigment, but no description is given of a pigment which can be employed specifically in aqueous basecoats.

It is therefore an object of the present invention to provide a N,N'-dimethylperylene-3,4,9,10-tetracarboxylic diimide which is suitable for aqueous basecoats and has advantageous performance properties.

We have found that this object is achieved by a N,N'-dimethyl-perylene-3,4,9,10-tetracarboxylic diimide pigment which is suitable for aqueous basecoats and which is obtainable by coating the diimide, suspended in an aqueous medium, with a carboxyl-carrying resin in the presence of 3,4-dicarboximidoperylene-9-sulfonic acid or salts thereof and with a $C_8$–$C_{18}$-alkyl- or -alkenylamine, isolating and drying the coated diimide and then subjecting it to dry milling.

We have also found the process defined hereby for preparing the N,N'-dimethylperylene-3,4,9,10-tetracarboxylic diimide pigment.

We have also discovered the use of this pigment for pigmenting aqueous basecoats.

The novel N,N'-dimethylperylene-3,4,9,10-tetracarboxylic diimide pigment can advantageously be obtained by the process according to the invention, in which the diimide, suspended in as fine a state of division as possible in an aqueous medium, is coated with a carboxyl-carrying resin, with 3,4-dicarboximidoperylene-9-sulfonic acid or salts thereof and with a $C_8$–$C_{18}$-alkyl- or -alkenylamine, or with the reaction products of these substances, and the diimide coated in this way is subjected, following its isolation, to dry milling.

Particularly suitable carboxyl-carrying resins are natural and modified natural resins, especially rosins, such as rosin itself and its generally known derivatives, for example dimerized, polymerized, hydrogenated and disproportionated rosin and the reaction products with maleic acid or fumaric acid. It is of course also possible to employ mixtures of these resins.

The amount of resin employed is generally 2–15% by weight, preferably 8–12% by weight, based on perylene-3,4,9,10-tetracarboxylic dianhydride.

The pigment additive, 3,4-dicarboximidoperylene-9-sulfonic acid, is preferably employed in the form of the free acid but can also be employed as an alkali metal salt, for example the sodium salt or potassium salt, the ammonium salt or an (in particular $C_8$–$C_{18}$-)alkylammonium salt.

Suitable amounts of 3,4-dicarboximidoperylene-9-sulfonic acid are in general 0.5–4% by weight, preferably 1.5–2% by weight, based on perylene-3,4,9,10-tetracarboxylic dianhydride.

Suitable amines are aliphatic amines having in general 8–18 carbon atoms, preferably 12–18 carbon atoms, which can be unsaturated but are preferably saturated. Particularly suitable such amines are monofunctional amines having a primary amino group. Examples which may be mentioned are n-octylamine, n-decylamine, n-dodecylamine, n-tetradecylamine, n-hexadecylamine (cetylamine), oleylamine and, in particular, n-octadecylamine (stearylamine).

The amine is normally employed in an amount of 2–15% by weight, preferably 8–12% by weight, based on perylene-3,4,9,10-tetracarboxylic dianhydride.

The coating of the diimide in accordance with the invention is carried out on pigment particles which are suspended in as fine a state of division as possible in an aqueous medium. Such suspensions can be obtained, for example, by stirring up the water-moist filter cake, which is obtained in the course of the diimide synthesis, in water or by dissolving the isolated and dried diimide in sulfuric acid and then subjecting it to precipitation in water.

Preferably, however, coating is coupled with the synthesis of the diimide, since in this way the best results are obtained and additional operations are omitted.

The N,N'-dimethylperylene-3,4,9,10-tetracarboxylic diimide is advantageously synthesized, as described in DE-A-43 25 247, by reacting an aqueous suspension of perylene-3,4,9,10-tetra-carboxylic dianhydride with 2–4 times the molar amount of methylamine in the form of an aqueous solution with a strength of preferably 40% by weight. In this case, the amine is added with cooling to about 0–10° C., preferably 0–5° C. The reaction mixture is then generally stirred at 5–10° C. for 2–3 hours and then generally at 70–90° C. for 1–2 hours in order to bring the reaction to completion.

The resin and 3,4-dicarboximidoperylene-9-sulfonic acid are preferably added to the perylene-3,4,9,10-tetracarboxylic dianhydride suspension prior to the addition of methylamine, but can also be added following imidation. The amine (especially stearylamine) is added following the formation of diimide. Preference is given to the use of a solution of the amine in an anhydrous or water-containing organic acid, such as glacial acetic acid or dilute acetic acid, or in a dilute inorganic acid such as sulfuric acid, but amine and acid can also be added separately from one another. The presence of the acid reduces the pH of the suspension (customary pH values are from about 3 to 5) and the resin, present in the form of a solution of the methylammonium salt, is precipitated onto the pigment particles.

In terms of the technical process an expedient procedure is to cool the reaction mixture present following imidation to about 50–65° C., to add amine and acid or an acidic solution of the amine and subsequently to stir the resulting mixture at this temperature for a further 1–3 hours.

Subsequent isolation of the diimide coated with resin, 3,4-dicarboximidoperylene-9-sulfonic acid and amine can be carried out in a customary manner after cooling to room temperature, namely by filtration, washing with water and drying at 80–100° C.

The final step in the novel process is to mill the dry, coated diimide in a ball mill to a mean particle size of preferably 0.02–0.06 μm, a procedure which generally takes 3–6 hours.

The diimide coated in accordance with the invention is easy to mill, does not stick to the balls or the wall of the mill, and after milling is a very loose-packed powder which is suitable directly for the preparation of coating materials.

The novel N,N'-dimethylperylene-3,4,9,10-tetracarboxylic diimide pigment is advantageously suitable for pigmenting aqueous basecoats where it is notable for good wettability and thus also for outstanding dispersibility and transparency, and also for a bright, yellowish red color.

EXAMPLES

A) Preparation of N,N'-dimethylperylene-3,4,9,10-tetracarboxylic diimide pigments according to the invention

EXAMPLES 1 to 6

100 g of perylene-3,4,9,10-tetracarboxylic dianhydride were introduced into 500 ml of water, and then a g of resin K and b g of 3,4-dicarboximidoperylene-9-sulfonic acid (salt) P were added. After stirring for 1 hour the suspension was cooled to 0° C. by adding 350 g of ice; then 80 ml of a 40% strength by weight aqueous methylamine solution were added and the mixture was stirred first at 5° C. for 2 hours and then at 80° C. for 1.5 hours. After cooling to 60° C., a solution of c g of amine A in 100 ml of glacial acetic acid was added.

After stirring the mixture for 1 hour and cooling it to room temperature the coated diimide was filtered off, washed to neutrality with water and dried at 80° C.

30 g portions of the dried, coated diimide were then milled in a 500 ml milling beaker with 200 ml of agate balls (diameter 5–15 mm), in a high-speed planetary mill for 5 hours, to give in each case about 27 g of finely divided (average particle size 0.02–0.06 μm), bright, yellowish red, transparent N,N'-dimethylperylene-3,4,9,10-tetracarboxylic diimide pigment which is very readily dispersible in aqueous basecoats.

Further details on these experiments and their results are compiled in the table below.

TABLE

| Ex. | a g K | b g P | c g A | Yield of dry coated diimide |
|---|---|---|---|---|
| 1 | 12 Polymerized rosin (Acid number 150–160 mg of KOH/g) | 2 3,4-Dicarboximido-perylene-9-sulfonic acid | 12 Stearylamine | 124 g |
| 2 | 8 Polymerized rosin (Acid number 150–160 mg of KOH/g) | 0,5 3,4-Dicarboximido-perylene-9-sulfonic acid | 15 Stearylamine | 121 g |
| 3 | 12 Polymerized rosin (Acid number 150–160 mg of KOH/g) | 2 3,4-Dicarboximido-perylene-9-sulfonic acid | 12 Stearylamine* | 125 g |
| 4 | 10 Rosin | 1 3,4-Dicarboximido-perylene-9-sulfonic acid | 5 Dodecylamine | 110 g |
| 5 | 15 Polymerized rosin (Acid number 150–160 mg of KOH/g) | 2 stearylammonium 3,4-dicarboximido-perylene-9-sulfonate | 5 Stearylamine | 112 g |
| 6 | 10 Polymerized rosin (Acid number 150–160 mg of KOH/g) | 4 3,4-Dicarboximido-perylene-9-sulfonic acid | 10 Octylamine | 118 g |

*the stearylamine was added first and then 10% strength by weight sulfuric acid was added until a pH of 4.5 was reached

EXAMPLE 7

The procedure of Example 1 was repeated but the rosin was not added until after the imidation, prior to the addition of the stearylamine solution. After drying, 123 g of coated diimide were obtained.

EXAMPLE 8

The diimide was synthesized as in Example 1 but only in the presence of 3,4-dicarboximidoperylene-9-sulfonic acid. After cooling to 40° C., the acid-coated diimide was filtered off and washed to neutrality.

The moist filter cake was then stirred up in 500 ml of water. The pH of the suspension was subsequently adjusted to 10 using 2% strength by weight sodium hydroxide solution and then the rosin was added and the mixture was subsequently stirred for 1 hour. Thereafter, the solution of stearylamine in acetic acid was added. After the mixture had been stirred for one hour it was worked up as in Example 1 to give 110 g of dry, coated diimide.

Comparison Example C 1

The procedure of Example 1 was repeated but the rosin (10% by weight, based on the diimide) was only admixed following the synthesis, isolation and ball-milling of the diimide coated with 3,4-dicarboximidoperylene-9-sulfonic acid and stearylamine.

Comparison Example C 2

The procedure of Example 1 was repeated but the stearylamine (10% by weight, based on the diimide) was only admixed following the synthesis, isolation and ball-milling of the diimide coated with rosin and 3,4-dicarboximidoperylene-9-sulfonic acid.

B) Assessment of the rheological and color properties

In order to assess the rheological properties, paints were prepared by using a Skandex apparatus to disperse in each case 15 g of pigment in 85 g of a commercial water-based polyurethane grinding varnish with a solids content of 22% by weight, dispersion being carried out for 2 hours and using 100 ml of SAZ beads.

The paints were evaluated within a period of 30 minutes after their preparation on the basis of the following scale:

1 flows very well 2 flows well 3 flows moderately 4 thick fluid 5 paste

The pigments from Examples 1 to 6, and 7 and 8, received marks of 1 and, respectively, 2, whereas marking of the comparison pigments prepared was at only the 4–5 level.

To evaluate the color properties, metallic paints were prepared comprising in each case 4% by weight of perylimide pigment and 4% by weight of aluminum flakes, based on the overall solids content, these metallic paints being based on a commercially available, water-thinnable binder system. The resulting metallic paints were sprayed onto a white-undercoated metal plate and stoved.

The finishes obtained with the pigments from Examples 1–8 were of a more yellowish red and were markedly brighter than with the comparison pigments.

We claim:

1. A coated pigment comprising N,N'-dimethylperylene-3,4,9,10-tetracarboxylic diimide obtained by either (1A) coating the diimide, suspended in an aqueous medium, with a carboxyl-carrying resin in the presence of 3,4-dicarboximidoperylene-9-sulfonic acid or salts thereof and with a $C_8$–$C_{18}$-alkyl- or -alkenylamine, to form a coated diimide, or (1B) said coating is coupled with the synthesis of the diimide, to form a coated diimide, followed by (2) isolating and drying the coated diimide and (3) then subjecting the isolated and dried coated diimide to dry milling.

2. A pigment as claimed in claim 1, wherein coating of the diimide is carried out in the course of synthesis of said diimide.

3. A pigment as claimed in claim 1, wherein the resin is a rosin.

4. A pigment as claimed in claim 1, wherein the amine is stearylamine.

5. A process for preparing a coated N,N'-dimethylperylene-3,4,9,10-tetracarboxylic diimide, which comprises either (1A) coating the diimide, suspended in an aqueous medium, with a carboxyl-carrying resin in the presence of 3,4-dicarboximidoperylene-9-sulfonic acid or salts thereof and with a $C_8$–$C_{18}$-alkyl- or -alkenylamine, to form the coated diimide, or (1B) said coating is coupled with the synthesis of the diimide, to form the coated diimide, followed by (2) isolating and drying the coated diimide and (3) then subjecting the isolated and dried coated diimide to dry milling.

6. A process as claimed in claim 5, wherein coating of the diimide is carried out in the course of synthesis of said diimide.

7. A process as claimed in claim 6, wherein said synthesis comprises reacting perylene-3,4,9,10-tetracarboxylic acid and/or its anhydride with methylamine in an aqueous medium in the presence of the carboxyl-carrying resin and of the 3,4-dicarboximidoperylene-9-sulfonic acid or salts thereof, and said coating comprises, after said synthesis, adding the $C_8$–$C_{18}$-alkyl- or -alkenylamine and an inorganic or organic acid to precipitate the resin and form said coated diimide, and then isolating, drying and subjecting the coated diimide to dry milling.

8. An aqueous basecoat comprising a pigment effective amount of the pigment as claimed in claim 1.

* * * * *